Feb. 21, 1967  H. FRAENKEL  3,305,089
APPARATUS FOR SORTING FLUORESCENT ARTICLES
Filed Aug. 13, 1965  3 Sheets-Sheet 1
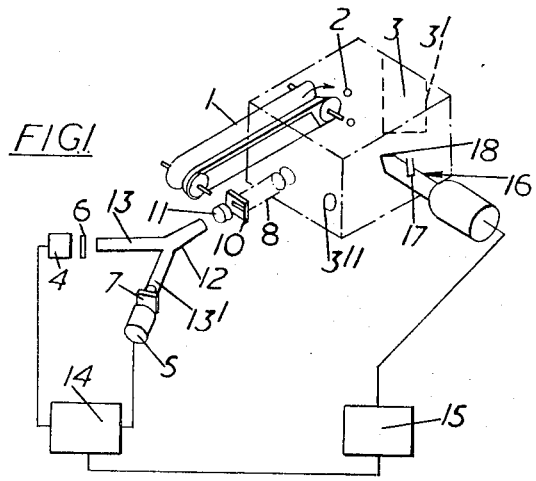
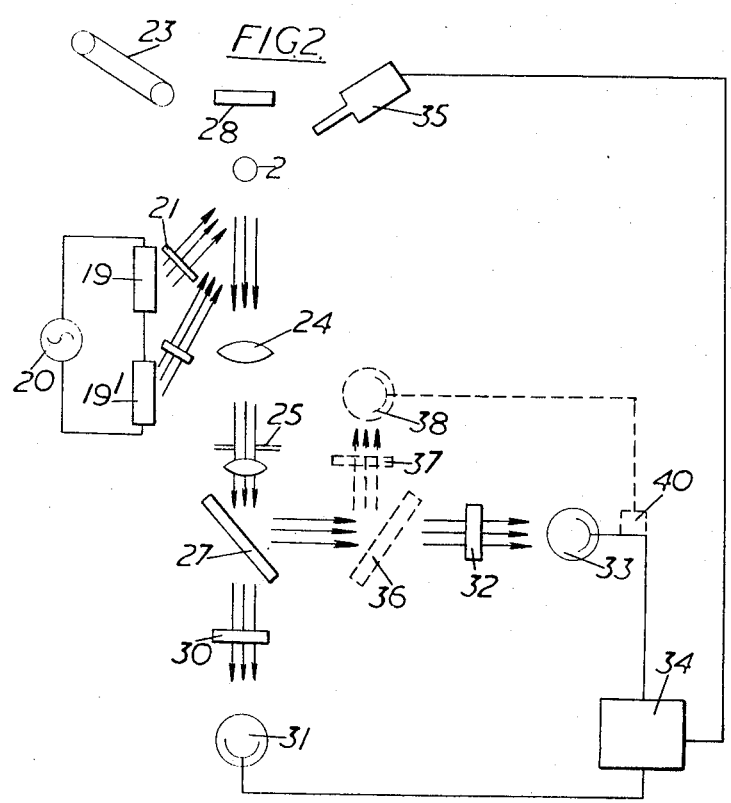

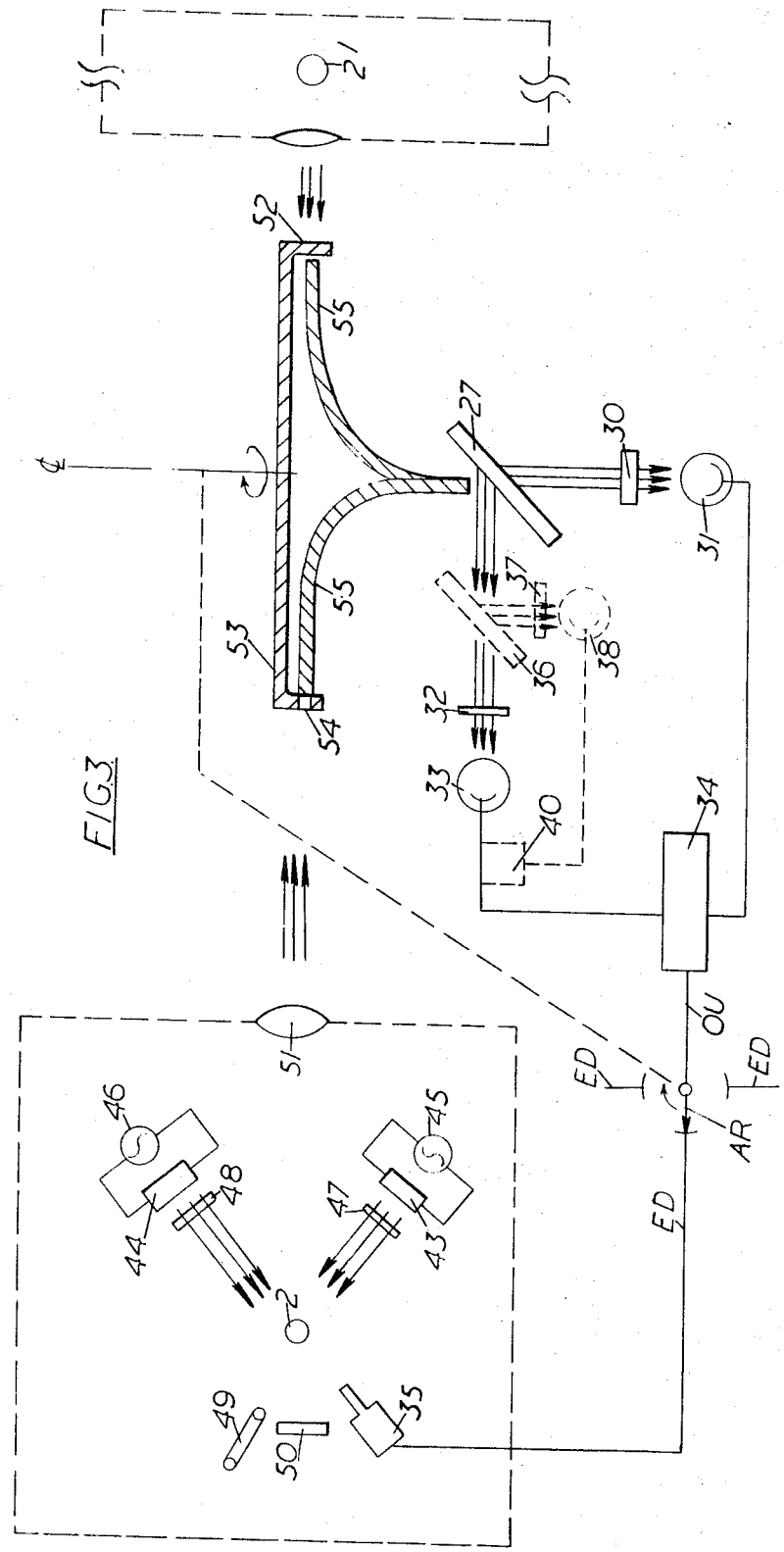

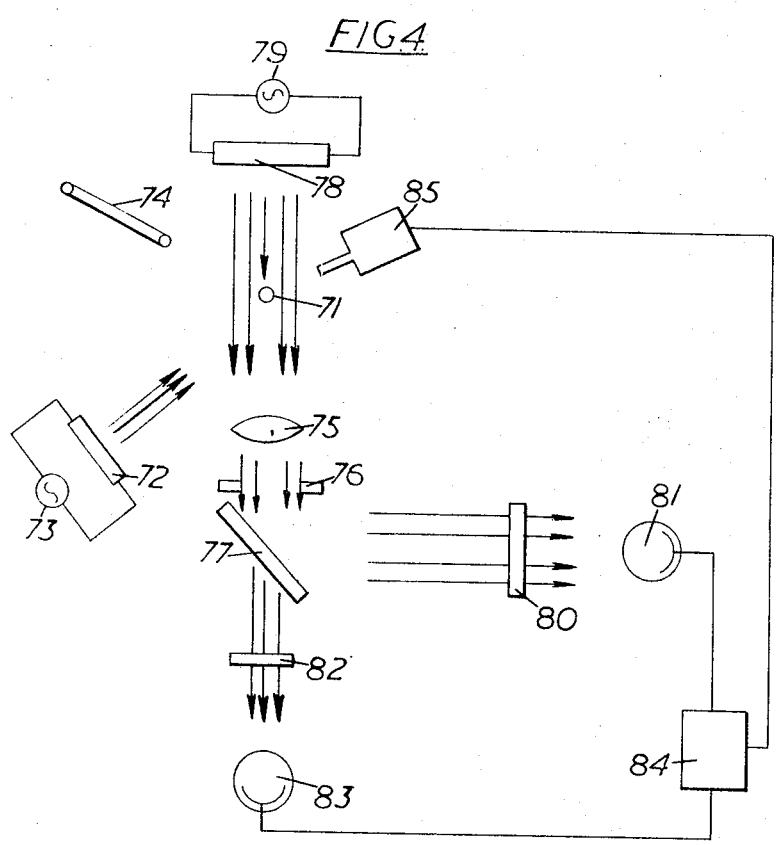

United States Patent Office 3,305,089
Patented Feb. 21, 1967

3,305,089
APPARATUS FOR SORTING
FLUORESCENT ARTICLES
Herbert Fraenkel, London, England, assignor to Gunson's Sortex Limited, London, England, a British company
Filed Aug. 13, 1965, Ser. No. 479,589
7 Claims. (Cl. 209—111.5)

This invention concerns sorting machines and is a continuation-in-part of our application Serial No. 276,498, filed April 29, 1963 and now abandoned.

According to one embodiment of the present invention there is provided a sorting machine for sorting desired from undesired objects comprising means for causing the objects to fluoresce, first photo-electric viewing means adapted to respond to and arranged to receive light produced by fluorescence from each object, illuminating means for illuminating the objects with radiation which is of a different wavelength from that of the said fluorescence and which will be reflected by the objects, second photo-electric viewing means adapted to respond to and arranged to receive said radiation which is reflected by each object, and separating means, controlled by signals produced by the first and second photo-electric viewing means for separating desired from undesired objects in dependence upon the fluorescence from each object.

Preferably all the light falling on the two or more photo-electric viewing means passes through a common light splitter.

The means for causing the objects to fluoresce preferably comprises at least one lamp adapted to provide ultra-violet light. Fluorescence could, however, be brought about by means of X-rays or high frequency fields.

Each of the photo-electric viewing means preferably has a light filter in front of it, the respective light filters being differently coloured.

There may be two photo-electric viewing means which are respectively adapted to respond to, and which are respectively arranged to receive, light of different wavelengths produced by fluorescence from the objects.

According to another embodiment of the invention there is provided a sorting machine for sorting desired from undesired objects comprising means for causing the objects to fluoresce, means for supplying the objects to be sorted to a number of different paths, illuminating means for illuminating the objects in each of said paths with radiation which is of a different wavelength from that of the said fluorescence, a photo-electric scanning head comprising first photo-electric viewing means adapted to respond to and arranged to receive light produced by fluorescence from said objects and second photo-electric viewing means adapted to respond to and arranged to receive radiation of said different wavelength which is reflected by said objects, means for causing said scanning head to view each said path in turn to produce a respective signal which is dependent upon the fluorescence from the object in a respective path, separating means associated with each said path, and means for passing the said signal from the scanning head to the respective separating means to effect separation of desired from undesired objects in the respective path.

The said illuminating means preferably comprise a source of infrared light.

According to another aspect of the present invention, there is provided a sorting machine for sorting desired from undesired objects comprising means for causing the objects to fluoresce, a first photo-electric viewing means adapted to respond to and arranged to receive light produced by fluorescence from each object, illuminating means for illuminating the objects with light of a wavelength different from that of the said fluorescence, a second photo-electric viewing means disposed on the opposite side of the objects to the said illuminating means and arranged to receive light from the latter, whereby the amount of light falling on the said second photo-electric viewing means will be reduced whenever an object is in its field of view, and separating means, controlled by signals produced by the said first and second photo-electric viewing means, for separating desired from undesired objects in dependence upon the fluorescence from each object.

The invention is illustrated, merely by way of example, in the accompanying drawings, in which FIGURES 1–4 are diagrammatic views respectively illustrating four different embodiments of the present invention.

Certain ground nuts have toxic moulds which fluoresce a different colour from those parts of the ground nuts which do not have such moulds on them. The invention will, for convenience, be hereinafter described mainly with reference to the sorting of good ground nuts from those which have such moulds, but it should be understood that the invention is not so restricted and may, for example, be used in the sorting of other nuts, seeds, beans and the like and in the sorting of a wide variety of objects including chips of certain minerals such, for example, as feldspar.

Referring now to FIGURE 1, a sorting machine comprises an endless belt 1 having a V-shaped recess for the reception of ground nuts 2 which are to be sorted. It will, of course, be appreciated that feeding devices other than the endless belt 1 may be used if desired.

Ground nuts 2, delivered by the belt 1, are allowed to fall freely therefrom one at a time, the ground nuts passing through a cube-shaped frame 3 having internally reflecting walls which are provided with backgrounds 3'.

Within the frame 3 are a number (only one shown) of lamps 3" each of which is adapted to produce ultra-violet light.

As a ground nut falls through the frame 3, light from the lamp 3" falls onto the ground nut 2 and the fluorescence produced thereby is viewed by one or more pairs of photocells (or photomultipliers) 4, 5, the latter viewing the ground nuts 2 against the respective background 3'.

The backgrounds 3' are selected to produce the same average intensity of fluorescence as the ground nuts 2 themselves, the backgrounds serving to reduce the influence of the size of the ground nut upon the amount of light received by the photocells 4, 5.

Although only one such pair of photocells 4, 5 is shown, it is preferred to use four such pairs, one at each side of the frame 3.

The photocells 4, 5 are respectively provided with differently coloured light filters 6, 7 so that one of the photocells of each pair is sensitive to and is arranged to receive fluorescence from the ground nuts 2 in one particular colour while the other photocell of the pair is sensitive to and arranged to receive fluorescence from the ground nuts 2 in a different colour. Filters (not shown) are mounted in front of the lamps 3" to ensure that the light directed onto the ground nuts 2 does not include light of the colours which the photocells 4, 5 are arranged to receive. This ensures that any light of the said colours falling on the photocells 4, 5 is due to fluorescence only.

The fluorescence received by the photocells 4, 5 from the ground nuts 2 is transmitted by way of a lens tube 8, which contains an objective 9 for focusing an image of a ground nut 2 onto a member 10 having a scanning slot 1, a lens system generally indicated at 11, and a transparent V-shaped light conducting member 12. The latter has arms 13, 13' which serve to split the fluorescence reflected from the ground nuts 2 into two portions which respectively fall on the photocells 4, 5.

The outputs of the photocells 4, 5 are connected across a difference amplifier 14. The output from the difference amplifier 14 is fed to an electronic comparator 15 where is is compared with a standard signal.

The comparator 15 is adapted, on the passage of a faulty ground nut through the frame 3, to produce a signal which opens a solenoid valve (not shown) of an ejector device 16. Compressed air is delivered to the device 16 via a line 17 and, when the said solenoid valve is opened, a puff of air is directed through a nozzle 18 so as to blow the faulty ground nut 2 away from the other ground nuts.

The ground nuts 2 supplied to the sorting machine of FIGURE 1 would preferably be blanched i.e. their skins would be removed. In practice, however, it would often happen that some of the ground nuts would be unblanched or incompletely blanched, that is to say some of the ground nuts supplied to the sorting machine would, in practice, still retain part or all of their skin.

The above-mentioned toxic moulds grow both on the skin and on the kernel of the ground nut, but whereas the unblemished skin produces relatively little fluorescence or reflection, the unblemished kernel fluoresces and reflects strongly. If, therefore, instead of employing pairs of photocells 4, 5 and differently coloured filters 6, 7 only one single photocell and filter were used, it would be impossible to effect satisfactory sorting. This is because if only a single photocell and filter were used, the signal obtained from the photocell would merely indicate the amount of light of a particular colour received from the ground nut. This particular amount of light however, could be produced either by a ground nut which had a skin on which there was a toxic mould or by a completely blanched ground nut whose kernal was unblemished. The reason for this is that the kernel fluoresces white, that is to say it fluoresces in a number of colours including the colour of the fluorescence of the toxic mould.

If, however, a single photocell were used without a light filter, satisfactory sorting would be even more impossible to obtain. This is because in this case the signal obtained from the photocell would merely indicate the total amount of light received from the ground nut. In the case of a blanched ground nut, however, the total amount of light produced may not be much affected by the presence or absence of a toxic mould, while this total amount of light would differ markedly from the total amount of light produced by either a blemished or an unblemished ground nut which was incompletely blanched.

The provision of the pairs of photocells 4, 5 and differently coloured filters 6, 7, however, overcomes this difficulty. This is because when the signals from the photocells 4, 5 are applied across the difference amplifier 14, the resultant signal from the difference amplifier 14 indicates the ratio of the amounts of light of the two different colours received by the photocells 4, 5 from the ground nut 2. In the case of a good ground nut, this ratio will be within a predetermined range whether the ground nut is blanched or not, whereas if the ground nut has a toxic mould either on its kernel or on its skin, the ratio will be outside the said predetermined range.

In FIG. 2 there is shown a sorting machine comprising lamps 19, 19' which are connected in an electrical circuit including a main or other source 20 of electrical current. The lamps 19, 19' are respectively adapted to produce ultra-violet and infra-red beams which are respectively directed through an ultra-violet transmitting filter 21 and an infra-red transmitting filter 22 and which converge towards a point past which may fall a ground nut 2 from an endless belt 23.

Light from the ground nut 2 is directed through a lens or lenses 24 and onto a member 25 having a scanning slot, light which has passed through the scanning slot passing through a lens or lenses 26 and falling onto a light splitter 27 which may be constituted by a sheet of glass or a half-silvered mirror.

The light reaching the light splitter 27 will be constituted in part by ultra-violet and infra-red light reflected from the ground nut 2 and in part by fluorescence produced by the ground nut 2 by reason of its excitation by the ultra-violet light. Light from the lamps 19, 19' which has passed through the filters 21, 22 is also reflected onto the light splitter 27 by a background 28.

Some of the light from the light splitter 27 will pass, via a filter 30 which transmits only infra-red light, to a photocell 31 which is sensitive to infra-red light. The remaining light from the light splitter 27 will pass, via a filter 32 which transmits only light of the colour in which the said toxic mould fluoresces, to a photocell 33 which is sensitive to light of this colour. The filters 21, 22 are such that they will not transmit light of this particular colour, while the background 28 is such that it reflects both light of this colour and infra-red light.

The outputs from the photocells 31, 33 are compared with each other, and against standards, in an amplifier 34, the output from the amplifier 34 being used to control an ejector device 35 which corresponds to the ejector device 16 of FIG. 1.

It will be appreciated that the output from the photocell 31 will, due to the use of the background 28, be relatively independent of the size of the ground nut 2 being viewed. The output from the photocell 31 will, however, be low if the ground nut 2, or the part thereof being viewed, has a skin since in this case there will be relatively little reflection of infra-red light, whereas the output of the photocell 31 will be high if the ground nut 2, or the part thereof being viewed, has no skin since in this case there will be considerable reflection of infra-red light.

The amplifier 34 includes electronic circuits (of a kind known per se) such that if only a low output is being produced by the photocell 31 (i.e. if an unblanched ground nut is being viewed), a low output from the photocell 33 (which will be caused by the presence of a fluorescing toxic mould) is sufficient to cause operation of the ejector device 35. On the other hand, if a high output is being produced by the photocell 31 (i.e. if a blanched ground nut is being viewed), only a high output from the photocell 33 (such as will be produced by the fluorescence from a kernel having a toxic mould thereon) will cause operation of the ejector device 35.

The quality of the sorting effected by the embodiment of FIG. 2 may be yet further improved by employing a light splitter 36 between the light splitter 27 and the filter 32, part of the light from the light splitter 36 passing via a filter 37 to a photocell 38. The filter 37 transmits light of one colour only, this colour being different from that of the filter 32. The outputs of the photocells 33, 38 are taken to a difference amplifier 40 where they are compared, the output of the amplifier 40 being fed to the amplifier 34.

In FIG. 3 there is shown a sorting machine having more than one sorting path through each of which passes a stream of ground nuts 2–2' to be sorted, only one such path, in the interests of clarity, being illustrated in detail in FIGURE 3. Each sorting path has associated with it lamps 43, 44 which are connected in electrical circuits including mains or other sources 45, 46 respectively of electrical current. The lamps 43, 44 are respectively adapted to produce ultra-violet and infra-red beams which are respectively directed through an ultra-violet transmitting filter 47 and an infra-red transmitting filter 48 and which converge towards a point past which may fall a ground nut 2 from an endless belt 49.

Light from the ground nut 2 (which light will consist of infra-red light, ultra-violet light, and light produced by fluorescence) and from a background 50 is directed through a lens or lenses 51 onto a flange 52 of a rotary disc 53. The background 50, which will reflect light from the lamps 43, 44 which has passed through the filters 47, 48, reflects both infra-red light and light of the colour in which sorting is taking place, the filters 47, 48 being such as not to transmit light of this particular colour.

The flange 52 has a small circular aperture 54 therein which, once per revolution, is brought into alignment with a light conducting rod 55, the latter having a diameter substantially greater than that of the aperture 54.

When the aperture 54 is in said alignment, the light conducting rod 55 will conduct the light from the lens or lenses 51 to a light splitter 27.

The remainder of the sorting machine of FIG. 3 will not be described since it is the same as and works in the same manner as that of FIG. 2, like parts being given the same reference numerals.

As explained above, the sorting machine of FIG. 3 is provided with a number of paths through each of which passes a stream of ground nuts, one at time. Each said path is provided with an ejector device 35, lamps 43, 44, a lens 51, and a light conducting rod 55. The various lenses 51, however, are arranged to direct light onto different portions of the flange 52, the various light conducting rods 55 respectively extending to the said portions. Thus as the disc 53 rotates, the photocells 31, 33 view each path in turn, the peripheral speed of the disc 53 being high compared with the falling speeds of the nuts 2 in the different paths. The outputs of the photocells 31, 33 are compared in the amplifier 34 the circuit of which includes a commutator device which rotates in synchronism with the rotary disc 53, and which, when a particular path is being viewed by the photocells 31, 33, passes the output of the amplifier 34 to the respective ejector device 35 associated with that path. As will be appreciated, the arrangement of FIGURE 3 considerably increases the speed of sorting which may be achieved. The commutator device is shown in FIGURE 3 as a rotary switch device comprising an arm AR rotatably driven in synchronism with disc 53 as by a drive shaft DR indicated in broken lines. The arm AR connects the output line OU of amplifier 34 with lines ED leading to the respective ejector devices 35 of the respective paths to operate the ejectors in sequence.

In FIG. 4 there is shown a sorting machine which would not in the form shown in FIG. 4 be ideally suited for the sorting of ground nuts but which would be very suitable for the sorting of certain other objects 71.

In the machine of FIG. 4, an ultra-violet lamp 72 is connected in an electrical circuit including a mains or other source 73 of electrical current. Ultra-violet light from the lamp 72 is arranged to fall on an object 71 falling from an endless band 74. The arrangement is such that ultra-violet light reflected from the object 71, together with fluorescence produced thereby, will be transmitted by way of a lens or lenses 75 and a scanning slot in a member 76 onto a light splitter 77.

Arranged behind the object 71, i.e., on the side of the object 71 opposite to that on which the light splitter 77 is disposed, is an infra-red lamp 78 which is connected in an electrical circuit including a mains or other source 79 of electrical current.

The infra-red lamp 78 will direct a beam of infra-red light towards the light splitter 77, whereby the presence of an object 71 in this beam will produce a shadow therein.

Some of the light from the light splitter 77 passes by way of a filter 80, which transmits only infra-red light, to a photocell 81. The remainder of the light from the light splitter 77 passes by way of a filter 82 to a photocell 83, the filter 82 being adapted to transmit only light of a colour corresponding to that of the fluorescence which is being examined in the object 71. The outputs of the photocells 81, 83 are compared against each other and against standards in an amplifier 84 which controls an ejector device 85, the ejector device 85 corresponding to the ejector device 16 of FIG. 1.

In the embodiment shown in FIG. 4, the signal produced by the photocell 83 will increase with increase in size of the object 71. As the object 71 increases in size, however, the shadow it produces in the infra-red beam from the lamp 78 also increases. The comparison between the signals from the photocells 81, 83 may therefore readily be arranged to be such as to compensate for variations in the size of the objects 71.

It will, of course, be appreciated that sorting will be improved if a light splitter, correspoding to the light splitter 36 of FIG. 2, is introduced between the light splitter 77 and the filter 82, and parts corresponding to the parts 37, 38, 40 of FIG. 1 are also provided.

In the embodiments of FIGS. 2 and 3, the two lamps 19, 19' and 43, 44 may be respectively replaced by a single lamp (not shown). This single lamp could be arranged to produce both ultra-violet and infra-red light.

Alternatively, this single lamp could be arranged to produce ultra-violet light only. In this case, the ultra-violet light falling on a ground nut 2 would both cause fluorescence and be reflected therefrom as ultra-violet light. It would thus be necessary to make the photocell 31 sensitive to ultra-violet light and to make the filter 30 transmit ultra-violet light only.

The light conducting member 12 of FIG. 1, instead of having only two arms 13, 13' as shown, could have three or more arms each of which extends adjacent to a photocell. Differently coloured filters could be employed in front of each of these photocells to permit sorting to be effected in three or more different colours.

I claim:

1. A sorting machine for sorting desired from undesired objects comprising at least one lamp adapted to direct ultra-violet light onto the objects to cause them to fluoresce, first photo-electric viewing means adapted to respond to and arranged to receive light produced by fluorescence from each object, illuminaitng means for illuminating the objects with infra-red light, second photo-electric viewing means adapted to respond to and arranged to receive infra-red light which is reflected by each object, and separating means, controlled by signals produced by the first and second photo-electric viewing means for separating desired from undesired objects in dependence upon the fluorescence from each object.

2. A sorting machine for sorting desired from undesired objects comprising means for causing the objects to fluoresce, first photo-electric viewing means adapted to respond to and arranged to receive light produced by fluorescence from each object, illuminating means for illuminating the objects with radiation which is of a wavelength different from that of the said fluorescence, second photo-electric viewing means disposed on the opposite side of the objects to the said illuminating means and arranged to receive light from the latter, whereby the amount of light falling on the said second photo-electric viewing means will be reduced whenever an object is in its field of view, and separating means, controlled by signals produced by the said first and second photo-electric viewing means, for separating desired from undesired objects in dependence upon the fluorescence from each object.

3. A sorting machine for sorting desired from undesired objects comprising at least one lamp adapted to direct ultra-violet light onto the objects to cause them to fluoresce, first photo-electric viewing means adapted to respond to and arranged to receive light produced by fluorescence from each object, illuminating means for illuminating the object with radiation which is of a wavelength different from that of the said fluorescence, second photo-electric viewing means disposed on the opposite side of the objects to the said illuminating means and arranged to receive light from the latter, whereby the amount of light falling on the said second photo-electric viewing means will be reduced whenever an object is in its field of view, and separating means, controlled by signals produced by the said first and second photo-electric viewing means, for separating desired from undesired objects in dependence upon the fluorescence from each object.

4. A sorting machine for sorting desired from undesired objects comprising at least one lamp adapted to direct ultra-violet light onto the objects to cause them to fluoresce, first photo-electric viewing means adapted to respond to and arranged to receive light produced by fluorescence from each object, illuminating means for illuminating the objects with infra-red light, second photo-electric viewing means disposed on the opposite side of the objects to the said illuminating means and arranged to receive light from the latter, whereby the amount of light falling on the said second photo-electric viewing means will be reduced whenever an object is in its field of view, and separating means, controlled by signals produced by the said first and second photo-electric viewing means, for separating desired from undesired objects in dependence upon the fluorescence from each object.

5. A sorting machine for sorting desired from undesired objects comprising means for causing the objects to fluoresce, first photo-electric viewing means adapted to respond to and arranged to receive light produced by fluorescence from each object, illuminating means for illuminating the objects with infra-red light, reflecting means adapted to reflect infra-red light, second photo-electric viewing means disposed on the opposite side of the objects from the reflecting means and adapted to receive infra-red light reflected by said objects and by said reflecting means, whereby the amount of infra-red light falling on the second photo-electric viewing means depends on the infra-red reflectivity of the object in its field of view, and separating means, controlled by signals produced by the said first and second photo-electric viewing means, for separating desired from undesired objects in dependence upon the fluorescence from each object.

6. A sorting machine for sorting desired from undesired objects comprising means for causing objects to fluoresce, first photo-electric viewing means comprising a pair of photo-electric cells and a pair of light filters placed in front of respective photocells and adapted to transmit light of different respective wavelengths produced by fluorescence from each object, illuminating means for illuminating the objects with infra-red light, reflecting means adapted to reflect infra-red light, second photo-electric viewing means disposed on the opposite side of the objects from the reflecting means and adapted to receive infra-red light reflected by said objects and by said reflecting means, whereby the amount of infra-red light falling on the second photo-electric viewing means depends on the infra-red reflectivity of the object in its field of view, and separating means, controlled by signals produced by the said first and second photo-electric viewing means, for separating desired from undesired objects in dependence upon the fluorescence from each object.

7. A sorting machine for sorting desired from undesired objects comprising first photo-electric viewing means adapted to respond to and arranged to receive light produced by fluorescence from each object, illuminating means for illuminating the objects with radiation which is of a wavelength different from that of the fluorescence, second photo-electric viewing means, first and second light filters disposed respectively in front of the first and second photo-electric viewing means and adapted to transmit said light produced by fluorescence and light of said wavelength respectively, a common light splitter disposed on the opposite side of the objects to said illuminating means and arranged so that all the light passing through the said filters passes therethrough, whereby the amount of light falling on the second photo-electric viewing means will be reduced whenever an object is in its field of view; and separating means, controlled by signals produced by the said first and second photo-electric viewing means, for separating desired from undesired objects in dependence upon the fluorescence from each object.

References Cited by the Examiner

UNITED STATES PATENTS 3,066,797  12/1962  Fraenkel _____ 209—111.6
3,207,910  9/1965  Hirschfeld _____ 209—111.6 X M. HENSON WOOD, Jr., *Primary Examiner.*

R. A. SCHACHER, *Assistant Examiner.*